Jan. 6, 1925.

W. W. PAUL

HEADLIGHT

Filed March 18, 1924   2 Sheets-Sheet 1

1,521,833

Inventor
W. W. Paul
By Lacy & Lacy, Attorneys

Jan. 6, 1925.
W. W. PAUL
1,521,833
HEADLIGHT
Filed March 18, 1924 2 Sheets-Sheet 2
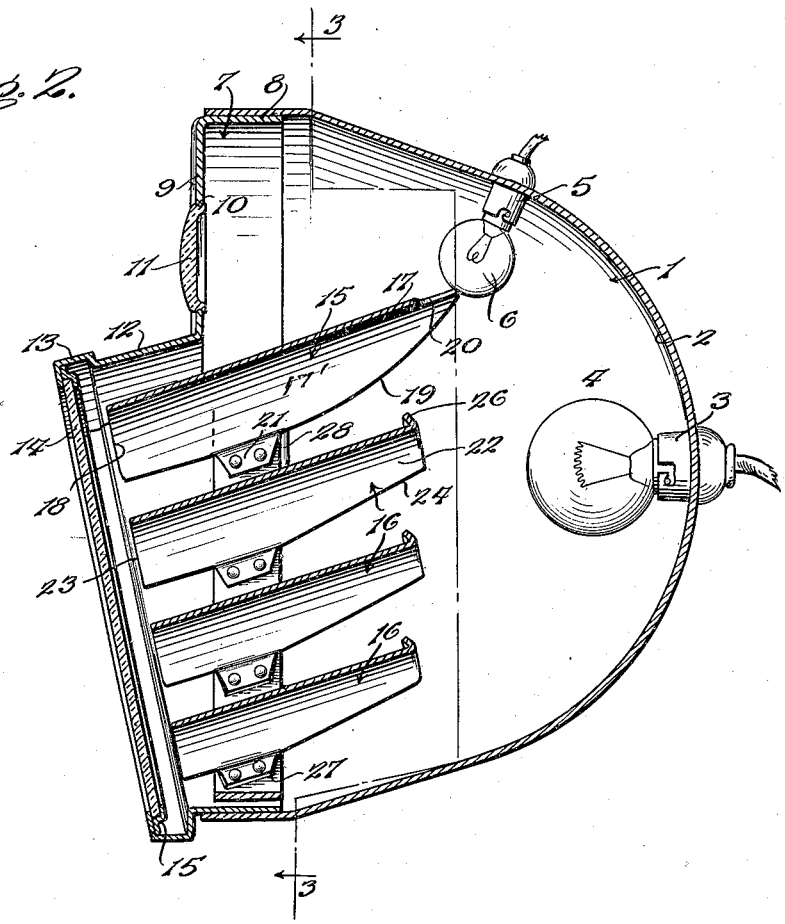
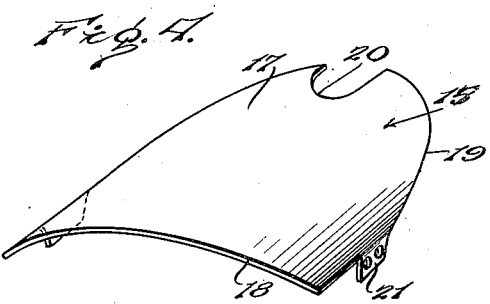
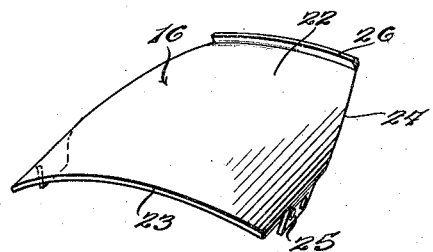
Inventor
W. W. Paul
By Lacey & Lacey, Attorneys Patented Jan. 6, 1925.

1,521,833

UNITED STATES PATENT OFFICE.

WILLIAM W. PAUL, OF CICERO, ILLINOIS.

HEADLIGHT.

Application filed March 18, 1924. Serial No. 700,055.

*To all whom it may concern:*

Be it known that I, WILLIAM W. PAUL, a citizen of the United States, residing at Cicero, in the county of Cook and State of Illinois, have invented certain new and useful Improvements in Headlights, of which the following is a specification.

This invention relates to improvements in non-glare headlights for motor vehicles and has as one of its objects to provide a headlight by the use of which the roadway in the path of travel of the vehicle upon which the headlights are mounted, will be sufficiently illuminated to guide the driver on his way but without rising to such elevation as to cause annoyance to or confusion of a driver of an oncoming machine, the headlights being further provided with lenses of distinctive colors in addition to the ordinary lenses to indicate to the driver of an oncoming machine the right and left hand sides of the car carrying the headlights.

Another object of the invention is to provide a headlight adapted to cast two different kinds of light rays, one kind being relatively short and cast substantially directly onto the road surface immediately in front of the machine and the other rays being of considerably greater length and cast a considerable distance in advance of the machine but on a proper level so as not to confuse an approaching motorist.

Another object of the invention is to provide a headlight front which may be adapted or applied to any of the ordinary types of headlight casings in place of the usual lens and its rim and may be readily removed for the purpose of removing and replacing burnt out lamp bulbs.

Another object of the invention is to provide a novel arrangement of louvers or light ray deflecting slats in order to provide for the reflection from the headlight of both long and short rays or beams of light.

In the accompanying drawings:

Figure 2 is a vertical front to rear sectional view on the line 2—2 of Figure 1, in detail, looking in the direction indicated by the arrows.

Figure 4 is a perspective view of the uppermost one of the series of louvers.

Figure 5 is a similar view illustrating another one of the said louvers.

Figure 1:
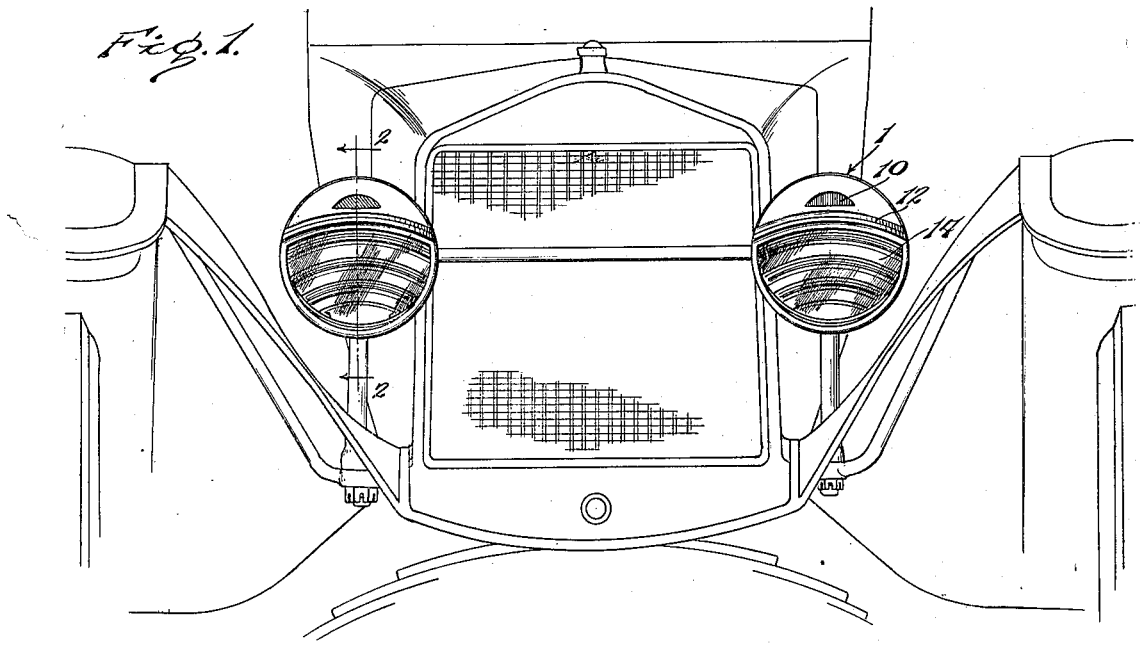
Figure 1 is a view in front elevation of a pair of the headlights embodying the present invention mounted upon a motor vehicle.
Figure 3:
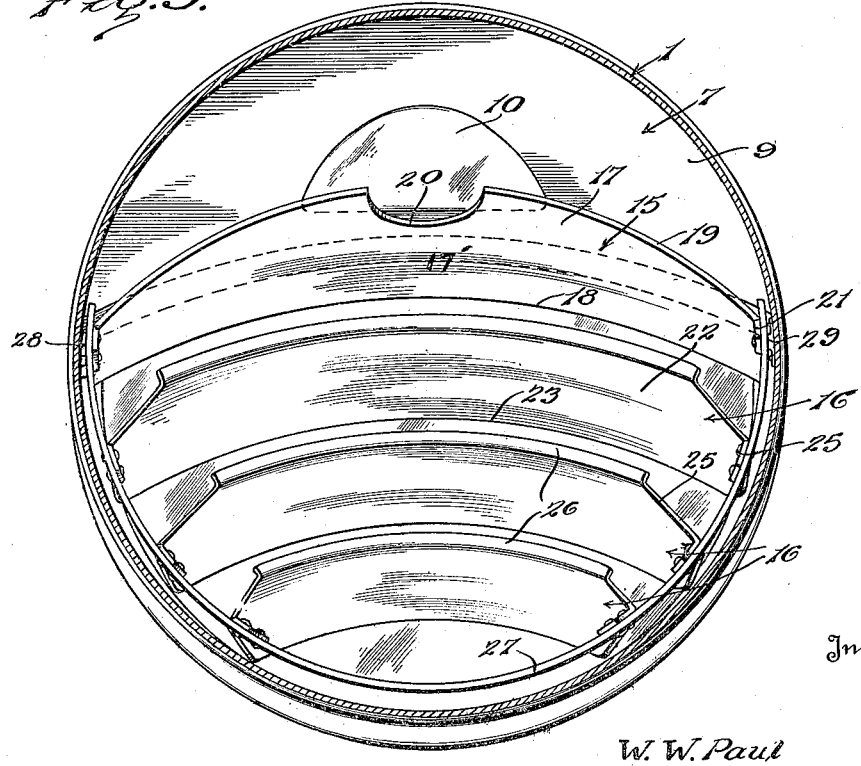
Figure 3 is a vertical transverse sectional view taken substantially on the line 3—3 of Figure 2, looking in the direction indicated by the arrows.

In the drawings, the numeral 1 indicates in general the shell of a headlight of any ordinary construction having the usual reflecting surface 2 and which shell may be of the bowl type or of the barrel type. Mounted centrally in the back of the shell is a lamp socket 3 in which is fitted an electric lamp bulb 4 having relatively large candle power. A similar socket 5 is mounted in the upper portion of the shell above and in advance of the socket 3 and accommodates the base of an electric light bulb 6 of small candle power.

The headlight embodies a front which is indicated in general by the numeral 7 and which embodies an annular rim 8 which is adapted to be fitted to the open front end of the shell 1 and connected therewith in a removable manner by any of the well known means usually employed for that purpose. A substantially crescent-shaped web 9 extends across the upper portion of the front 7 of the headlight and is imperforate except for an opening 10 which is formed therein and is likewise substantially crescent-shaped and receives a correspondingly shaped lens 11. In practice the lens which is within the headlight at the right hand side of the vehicle upon which the headlights are installed, will be green in color, and the lens of the other headlight will be red in color so that one backing into a parking space may readily determine the position of the front of the machine which will be back of him when parked, thus avoiding or minimizing damage to fenders and other parts of the vehicle, the arrangement of lenses likewise serving to apprise the driver of an oncoming machine as to the location of the right and left hand sides of the machine which he is approaching.

The lower portion of the front 7 is provided with a forwardly offset extension 12 provided at its front with a circumscribing flange 13 behind which is mounted the periphery of a plain glass lens 14, any appropriate means, such for example as an annular frame 15, being provided for retaining the lens in place. The extension 12 is not only offset in a forward direction, but is also more or less inclined in a downward direction so that the lens 14 is presented at an angle toward the road surface in advance of the vehicle upon which the headlight is mounted.

The headlight embodies a plurality of light ray deflecting and reflecting louvers or slats, one of which is indicated by the numeral 17 and the others by the numeral 16. The louver 17 comprises a transversely arched plate 17' the forward edge 18 of which is straight or rather so arranged that all portions thereof occupy a common plane, although this edge is arched to conform to the transverse curvature of the louver plate. The rear portions of the side edges of the louver plate and the rear ends of the louver plate are curved as indicated by the numeral 19, to conform substantially to the curvature of the inner or reflecting surface 2 of the shell 1 at the forward portion of the said reflector shell. For a purpose to be presently explained, the plate 17' is formed in its rear edge with an arcuate recess 20, and at its opposite side margins with downwardly projecting ears 21. Each of the louvers 16 comprises a transversely curved or arched louver plate 22 having an arcuate forward edge 23 all portions of the length of which occupy a common plane, as in the case of the forward edge 18 of the louver plate 17'. The side edges of the plate 22 at the rear portion of the plate are curved as indicated by the numeral 24 to more or less closely conform to the curvature of the shell 1 at the forward portion thereof, and inasmuch as the plates 22 are to be located one above another in a manner which will presently be explained, and their rear ends are to occupy substantially the same vertical plane, the plates are of decreasing width and decreasing length. Each plate 22 at its opposite lateral edges near the front of the plate, is provided with ears 25 corresponding to the ears 21 of the plate 17', and the rear edge of each of the louver plates 22 is provided with an upwardly and forwardly inclined overhanging flange 26 conforming to the transverse curvature of the respective plates.

The numeral 27 indicates a substantially semi-annular frame within the bounds of which the louver plates 17' and 22 are arranged in spaced relation one above another, and in a downwardly and forwardly inclined position, with their outer sides substantially parallel to one another. The plates are secured in position by riveting or otherwise securing the ears 21 and 25 to the opposite sides of the frame 27, and said frame at one side is hingedly mounted as at 28, within the rim 8 of the headlight front, a suitable latch and keeper 29 being provided at the opposite side of the said frame and rim in order that the frame may be held in position immediately in rear of the lens 14. The louvers are so proportioned and arranged that their forward edges 18 and 23 will occupy substantially a common plane parallel to the plane of the lens 14, and as previously stated, their rear edges, or at least the rear edges of the louvers 16, occupy approximately the same vertical plane. The under sides of the louver plates 17' and 22 are finished so as to constitute reflecting surfaces, whereas the upper sides of the said plates are enameled or otherwise finished in flat black.

By reference to Figure 2 of the drawings, it will be observed that the arcuate recess 20 in the rear edge of the louver plate 17' is located substantially opposite and relatively close to the lower portion of the bulb 6 whereas the upper ones of the louver plates 22 are located in front of the bulb 4. By forming the recess 20 in the rear edge of the louver plate 17', the light rays from the bulb 6 may pass practically unobstructedly to the lens 11 and as this bulb is of relatively low candle power and the lens is a colored lens, the lens will serve its purpose without causing any annoyance to the driver of an oncoming machine. Light rays from the bulb 4 and from the reflecting surface 2 of the shell 1 which strike the under sides of the louver plates will be reflected in a downward and forward direction and onto the roadway substantially directly in front of the vehicle upon which the headlights are mounted, these reflected rays being the short rays heretofore referred to. By further reference to Figure 2 it will be observed that the upper edges of the flanges 26 are located below a horizontal line touching the forward edges of the louver plate next above in the series so that a portion of the rays from the bulb 4 will be reflected directly forwardly and for a considerable distance. However, due to the angular disposition of the louvers, these longer rays will not be projected to a level where they would cause annoyance to the driver of an oncoming vehicle and yet they serve to illuminate the roadway a considerable distance in advance of the machine upon which the headlights are mounted.

Having thus described the invention, what is claimed as new is:

1. A headlight comprising a major source of illumination, a minor source of illumination, a front structure supported in advance of the said sources and having an upright upper portion, a light ray transmitting medium in the upper portion of the said front structure opposite the minor source of illumination, the said front structure being provided at its lower portion with a forwardly and downwardly offset extension, a light ray transmitting medium in the open front of said extension, the said light ray transmitting medium being located substantally opposite the major source of illumination, and light ray deflecting louvers supported one above another between the said source of illumination and the last mentioned light ray transmitting medium, the said louvers being arranged in downwardly and forwardly inclined position.

2. A headlight comprising a major source of illumination, a minor source of illumination, a front structure supported in advance of the said sources and having an upright upper portion, a light ray transmitting medium in the upper portion of the said front structure opposite the minor source of illumination, the said front structure being provided at its lower portion with a forwardly and downwardly offset extension, a light ray transmitting medium in the open front of said extension, the said light ray transmitting medium being located substantially opposite the major source of illumination, and light ray deflecting louvers supported one above another between the said source of illumination and the last mentioned light ray transmitting medium, the said louvers being arranged in downwardly and forwardly inclined position, and having reflecting under sides and non-reflecting upper sides.

3. A headlight comprising a shell having a front occupying a perpendicular plane, a major source of illumination within the shell, a minor source of illumination within the shell above the major source of illumination, a front structure supported within the front of the shell and having an opaque substantially crescent-shaped upper portion, a light ray transmitting lens in the said opaque upper portion of the front structure immediately in advance of and substantially in a horizontal line with the minor source of illumination, the said front structure having an approximately cylindrical downwardly and forwardly extending casing portion, a light ray transmitting medium arranged within the front of the said casing portion, and a plurality of louvers arranged within the front structure within the circumferential bounds of the said casing portion and at their forward portions extending into the said casing porton and at their rear portions extending into the shell upwardly and rearwardly in the direction of the sources of illumination.

In testimony whereof I affix my signature.

WILLIAM W. PAUL. [L. S.]